(12) United States Patent
Xiao

(10) Patent No.: US 12,492,768 B2
(45) Date of Patent: Dec. 9, 2025

(54) CONDUIT JOINT AND AUXILIARY RELEASE COMPONENT THEREOF

(71) Applicant: XIAMEN TONGJIE TECHNOLOGY., LTD, Xiamen (CN)

(72) Inventor: Lihua Xiao, Xiamen (CN)

(73) Assignee: XIAMEN TONGJIE TECHNOLOGY., LTD, Xiamen (CN)

( * ) Notice: Subject to any disclaimer, the term of this patent is extended or adjusted under 35 U.S.C. 154(b) by 0 days.

(21) Appl. No.: 19/078,311

(22) Filed: Mar. 13, 2025

(65) Prior Publication Data

US 2025/0207701 A1    Jun. 26, 2025

(51) Int. Cl.
*F16L 37/091* (2006.01)

(52) U.S. Cl.
CPC ................................ *F16L 37/0915* (2016.05)

(58) Field of Classification Search
CPC . F16L 37/0915; F16L 37/091; F16L 37/0887; F16L 37/088; F16L 37/098; F16L 37/0982; F16L 37/0927
See application file for complete search history.

(56) References Cited

U.S. PATENT DOCUMENTS

| | | |
|---|---|---|
| 2005/0200122 A1 | 9/2005 | Mittersteiner et al. |
| 2008/0185839 A1 | 8/2008 | Mittersteiner et al. |
| 2013/0257042 A1 | 10/2013 | Rosenblum et al. |
| 2020/0096145 A1* | 3/2020 | Lin .......................... F16L 37/12 |
| 2023/0341071 A1* | 10/2023 | Fardon ................ F16L 37/0915 |

* cited by examiner

*Primary Examiner* — Aaron M Dunwoody
(74) *Attorney, Agent, or Firm* — Zhigang Ma

(57) ABSTRACT

A conduit joint and an auxiliary release component thereof are provided, and belong to the field of conduits. The auxiliary release component includes a sleeve and a releaser. The sleeve is an annular sleeve. The sleeve includes an upper sleeve, a lower sleeve and a connector for connecting the upper sleeve and the lower sleeve. A region between the upper sleeve and the lower sleeve is partitioned by the connector to form at least one first notch. The releaser includes an open release part and a handle part located behind the release part. The auxiliary release component has the advantage that a conduit is easily taken out from the conduit joint.

7 Claims, 6 Drawing Sheets

CONDUIT JOINT AND AUXILIARY RELEASE COMPONENT THEREOF

TECHNICAL FIELD

The present disclosure belongs to the field of conduits, and more specifically relates to a conduit joint and an auxiliary release component thereof.

BACKGROUND

In modern construction, industrial production and daily life, conduit systems play a key role in transporting fluids (including liquids, gases and even plasmas). From the domestic water system to the complex network of schools, medical facilities and commercial buildings, the conduit system ensures the effective circulation and utilization of various fluids such as cold and hot water, air, ethylene glycol, compressed air, inert gas, chemicals, wastewater, cooling media and coatings. Conduits are made of various materials, including copper, stainless steel, CPVC (chlorinated polyvinyl chloride) and PEX (cross-linked polyethylene). The selection of these materials is often based on fluid properties, pressure requirements and cost considerations. In this discussion, the term "conduit" or "conduit system" refers to an overall system including conduits, pipe conduits, conduit elements, and combinations thereof in general.

As the basis of building a complex conduit system, conduit connection must flexibly adapt to the needs of different layout and direction changes. The conduit system is efficiently assembled by using various fittings and valves, such as elbows, tees, connectors, and ball valves and globe valves for size conversion, terminal connection, flow control.

Historically, conduit connection is largely relied on welding and brazing techniques. Although these traditional methods are effective, these traditional methods face many challenges. Brazing requires not only extensive preparation work, such as cleaning of conduit ends, application of flux, but also professional skills and protective equipment, so that the process is time-consuming and has safety risks. In addition, brazing materials (such as solder and welding torch) and subsequent inspection are high in cost and not suitable for all material combinations.

In recent years, the push-fit technology has gradually emerged in conduit connection because of the characteristics of convenience, high speed and low material requirement. This technology only requires conduits, quick-connect fittings, deburring tools and cutters to complete installation, so that the operational process is greatly simplified. The core of push-fit connection lies in the gear ring (a chuck, or a clamping ring), automatic clamping can be realized when the conduit is inserted to form reliable seal and connection without extra tools or welding operation.

However, the early push-fit connection technology also has shortcomings. For example, the plastic clamping ring support is prone to fail when subjected to tensile force, and the gear ring is fixed by relying on additional embossing, gluing or threaded cap, which not only increases the manufacturing cost, but also reduces the production efficiency. The thread cap method also needs to consider the cost of threading machining and the use of a sealant, and the imprint method may cause the gear ring to be permanently fixed and difficult to repair or replace.

In addition, traditional connection technologies are often limited to connections between similar materials, and there is a lack of effective solutions for the combination of copper and different materials such as CPVC, PEX, and stainless steel. Once a problem occurs, it is usually necessary to replace the parts as a whole instead of repairing faulty parts, which not only wastes resources, but also increases maintenance costs.

SUMMARY

Aiming at the shortages in the prior art, the present disclosure aims to provide an auxiliary release component of a conduit joint. The auxiliary release component of a conduit joint has the advantage that a conduit joint is easily taken out from the inside of the conduit joint.

In order to achieve above-mentioned purpose, the present disclosure provides the following technical scheme.

An auxiliary release component of a conduit joint includes a sleeve and a releaser.

The sleeve includes an upper sleeve, a lower sleeve and a connector for connecting the upper sleeve and the lower sleeve, and a region between the upper sleeve and the lower sleeve is partitioned by the connector to form at least one first notch. The releaser includes an open release part and a handle part located behind the release part.

The present disclosure is further provided that two groups of connectors are provided, and the two groups of connectors are symmetrically provided. A region between the upper sleeve and the lower sleeve are partitioned by the connectors to form two symmetrical first notches.

The present disclosure is further provided that the release part includes two legs and a waist for connecting the two legs. One end, away from the waist, of each of the two legs is provided with a guide part. The thickness of the guide part is gradually increased from one end away from the waist to the other end.

The present disclosure is further provided that the two legs and the waist are integrally formed.

The present disclosure is further provided that the upper sleeve, the lower sleeve and the connectors are integrally formed.

The present disclosure is further provided that the inner wall of the connector is in the shape of a cambered surface.

The present disclosure is further provided that a conduit joint structure matched with the auxiliary release component includes a main body. An inner wall of the main body is concave inward to form a first avoidance channel for a protruding portion of a propeller to move.

The present disclosure is further provided that the first avoidance channel is internally provided with a conduit support member. The conduit support member is divided into an upper part and a lower part independent from each other. An inner wall of the upper part is concave inward to form a second avoidance channel for the protruding portion of a propeller to move after being clamped.

An inner wall of the lower part is larger than the outer diameter of the conduit. The propeller can be inserted between the inner wall of the lower part and an outer wall of the conduit. The bottom of the lower part abuts against a gear ring, and the top of the lower part is connected to the upper part.

The present disclosure is further provided that a second notch is formed in the upper part.

In conclusion, the present disclosure at least has the following advantages.

Firstly, a component for releasing a conduit is formed by setting a sleeve and a releaser. The sleeve can sleeve the outer wall of the conduit joint with external force. The peripheral wall of the conduit joint can be convex to form a step and the upper sleeve and the lower sleeve are respectively located on both sides of the convex step, so the upper sleeve and the lower sleeve can be limited by the step to realize the assembly of the sleeve on the conduit joint. At this time, the upper sleeve and the lower sleeve are respectively located outside the end of the conduit joint and outside the circumferential side wall of the conduit joint. When it is necessary to release the conduit clamped in the conduit joint, the releaser needs to be inserted between the upper sleeve and the propeller at the end of the conduit joint, so that the existing propeller extrudes the gear ring inside the conduit joint. Therefore, the conduit is loosened by the gear ring, and then the conduit is easily taken out from the conduit joint.

Reference signs: 1, sleeve; 11, upper sleeve; 12, lower sleeve; 13, connector; 14, first notch; 141, gap; 2, releaser; 21, release part; 211, leg; 2111, guide part; 212, waist; 22, handle part; 3, conduit joint; 31, main body; 311, step; 312, first avoidance channel; 32, seal member; 33, seal ring support member; 34, gear ring; 35, conduit support member; 351, upper part; 3511, second avoidance channel; 3512, second notch; 352, lower part; 3521, boss; 36, propeller; 361, protruding portion; and 4, conduit.

DETAILED DESCRIPTION OF THE EMBODIMENTS

The following describes the present disclosure in detail with reference to the attached figures.

Figure 1:
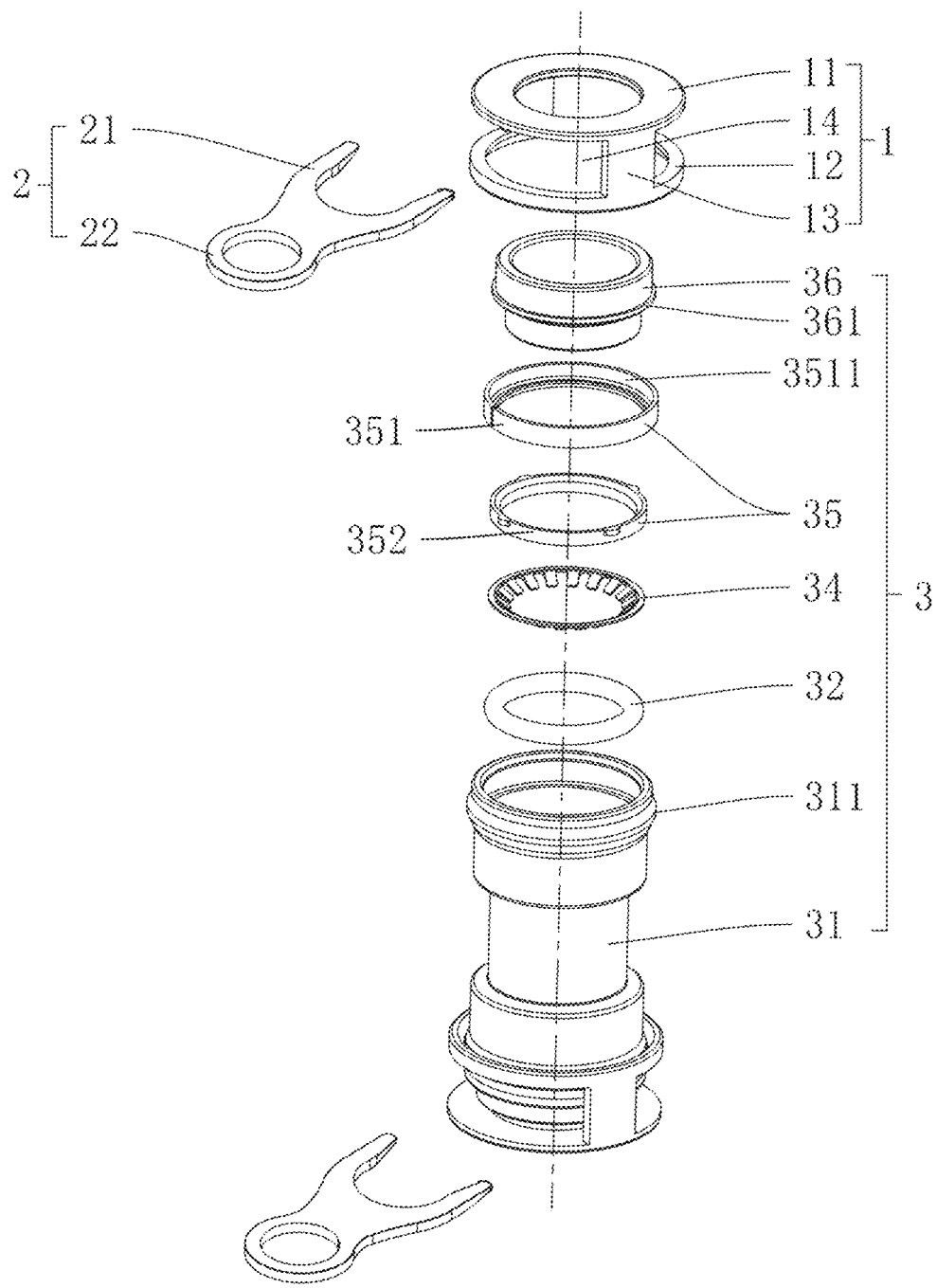
FIG. 1 is a local schematic diagram in one preferred embodiment of the present disclosure.

A conduit joint and an auxiliary release component thereof are provided. As shown in FIG. 1, the conduit joint 3 includes a main body 31. The main body 31 may be a straight pipe, a three-way pipe or a multi-way pipe. In an embodiment that the main body 11 is a multi-way pipe, a sleeve 1 in the auxiliary component in the present disclosure may be assembled at each pipe opening, and only one releaser 2 is needed.

Figure 2:
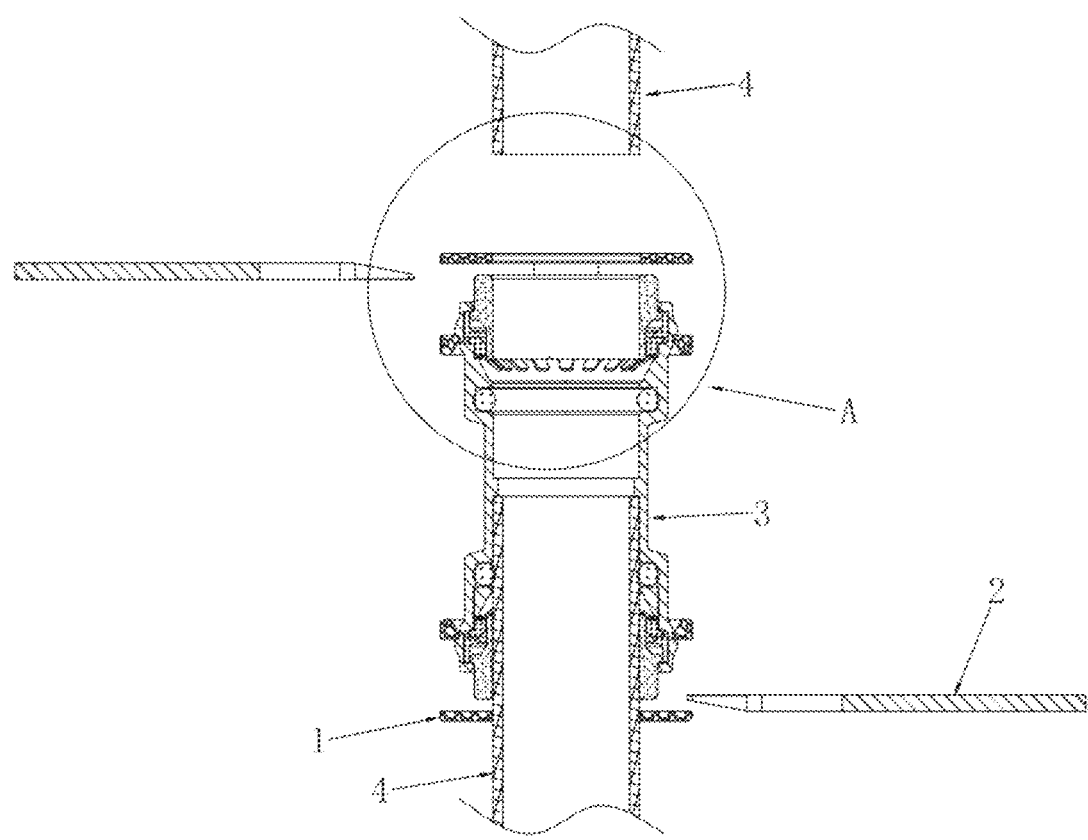
FIG. 2 is a cross-section schematic diagram in one preferred embodiment of the present disclosure.
Figure 3:
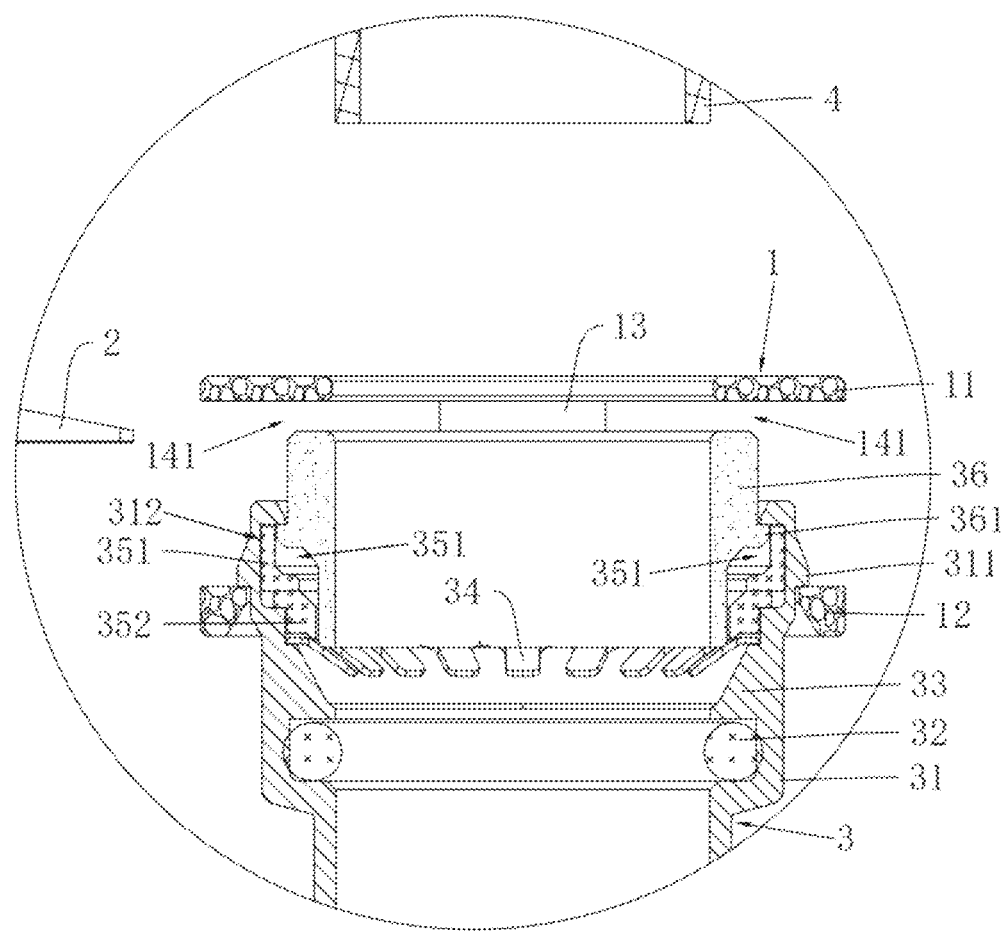
FIG. 3 is an enlarged schematic diagram of part A in FIG. 2.

As shown in FIG. 1 to FIG. 3, the interior of any end of the main body 31 is sequentially provided with a seal member 32 (such as a rubber ring for sealing, in different embodiments, one or more seal members 32 may be provided, and a plurality of seal members 32 may be stacked or separated mutually), a gear ring 34 (for clamping a conduit 4), a conduit support member 35 and a propeller 36 from inside to outside. The above-mentioned interior members are all annularly arranged at an inner wall position of the main body 31.

Wherein, as shown in FIG. 3, an inner wall of the main body 31 is concave inward to form a first avoidance channel 312 for a protruding portion 361 of the propeller 36 to move, so that the protruding portion 361 of the propeller 36 may penetrate into the first avoidance channel 312 and move at a certain distance along an axial direction of the main body 31 to further extrude the gear ring 34, so that each tooth is elastically deformed.

Figure 6:
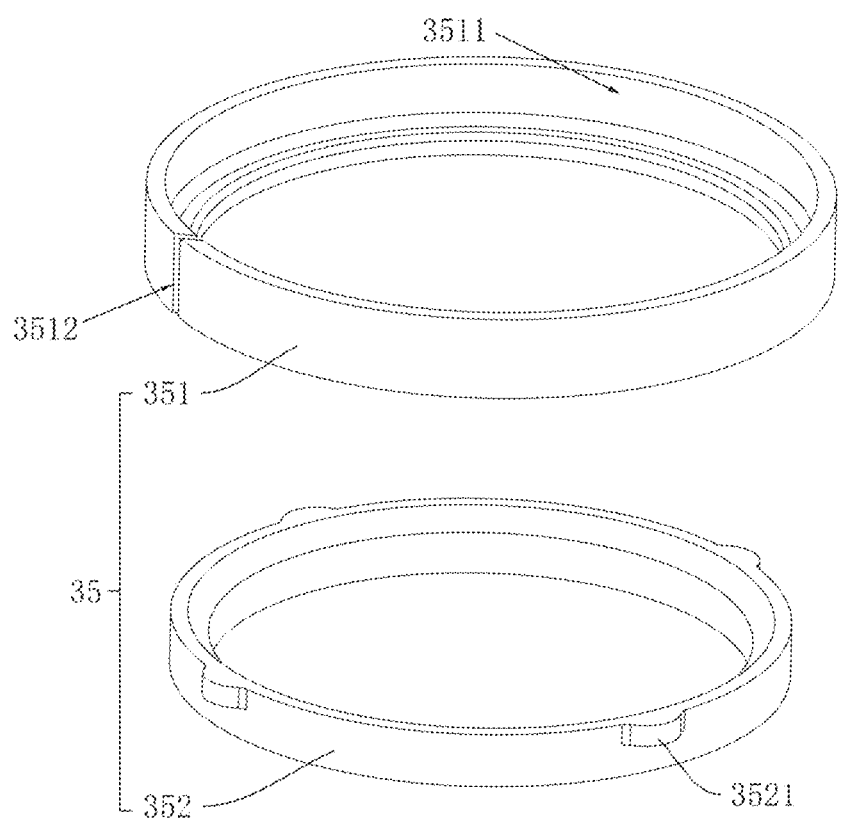
FIG. 6 is a structure diagram of a conduit support member in one preferred embodiment of the present disclosure.

In addition, in order to further improve the clamping force of the gear ring 34 to the conduit 4, in some preferred embodiments, the first avoidance channel 312 is internally provided with a conduit support member 35. As shown in FIG. 3 and FIG. 6, the conduit support member 35 is divided into an upper part 351 and a lower part 352 independent from each other, and the upper part 351 and the lower part 352 are upper and lower structures and abut against each other. Wherein, the upper part 351 is annular, and an inner wall of the upper part 351 is concave inward to form a second avoidance channel 3511, so that the upper part 351 has a step-shaped cross section or an n-shaped cross section for the protruding portion 361 of the propeller 36 to move axially after being clamped. In addition, a second notch 3512 may be formed in the upper part 351 to provide an inner diameter change effect, so that the annular upper part 351 is conveniently assembled into the first avoidance channel 312.

In addition, the lower part 352 is also annular. An inner wall of the lower part 352 is slightly larger than the outer diameter of the conduit 4, so that the propeller 36 may be inserted between the inner wall of the lower part 352 and an outer wall of the conduit 4. A lower end surface of the lower part 352 abuts against the gear ring 34 for pressing the gear ring 34, and an upper end surface of the lower part 352 is convex outward radially to form bosses 3521. At least two bosses 3521 are provided. In the preferred embodiment, four bosses 3521 are provided. An upper end surface of the boss 3521 abuts against a lower end surface of the upper part 351, so that force is transmitted to the upper part 351. When the conduit 4 is pulled out outward, the conduit 4 may be clamped by the gear ring 34. At this time, upward force received by the gear ring 34 can be transmitted to the propeller 36 and also transmitted to the conduit support member 35 from the lower part 352 to the upper part 351, thereby achieving a double clamping effect on the conduit 4 inserted into the main body 31.

In some embodiments, the teeth of the gear ring 34 are slant towards a direction away from the propeller 36, and the inner diameter (referring to the measurement to teeth instead of the ring) of the gear ring 34 is slightly smaller than the inner diameter of the propeller 36, so that after a conduit 4 is inserted into the propeller 36, the gear ring 34 can be pushed away to limit the conduit 4 from being pulled out after being inserted.

When the conduit is released, the gear ring 34 can be deformed towards a direction away from the propeller 36 by pushing the propeller 36 to the direction of the gear ring 34, so that the conduit 4 is loosened and taken out. It is worth mentioning that the main body 31 to which the auxiliary release component in the present disclosure can be adapted is not limited by internal members of the above-mentioned main body 31, and can be adapted to any main body 31 having a propeller 36. When there is no seal member 32 or seal ring support member 33 in the main body 31, or the gear ring 34 is integrally annular, or the seal ring support member 33 and the main body 31 are not integrally formed (namely, the seal ring support member 33 may be separated from the main body 31), the auxiliary release component in the present disclosure can also achieve release of the conduit 4.

In some embodiments, as shown in FIG. 1 and FIG. 3, the auxiliary release component of a conduit joint includes a sleeve 1 and a releaser 2. Wherein, the sleeve 1 may be made of metal, plastic or other materials with certain hardness without limitation. The sleeve 1 includes an upper sleeve 11, a lower sleeve 12 and a connector 13 for connecting the upper sleeve 11 and the lower sleeve 12. Wherein, the upper sleeve 11, the lower sleeve 12 and the connector 13 are integrally formed, preferably. The upper sleeve 11 in the present disclosure is annular, and the lower sleeve 12 is preferably annular (as shown in FIG. 1). A region between the upper sleeve 11 and the lower sleeve 12 is partitioned by the connector 13 to form at least one first notch 14. Preferably, two groups of connectors 13 are provided, and the two groups of connectors 13 are symmetrically provided. An inner wall of the connector 13 is preferably in the shape of a cambered surface. A region between the upper sleeve 11 and the lower sleeve 12 is partitioned by the connectors 13 to form two symmetrical first notches 14. A front end of the releaser 2 is inserted into the first notches 14.

As shown in FIG. 3, after the sleeve 1 sleeves an outer wall of the conduit joint 3, the upper sleeve 11 and the lower sleeve 12 are respectively located outside an end of the conduit joint 3 and a circumferential side wall of the conduit joint 3. It is worth mentioning that the auxiliary release component of a conduit joint in the present disclosure requires that a peripheral wall, at any end, of the main body 31 of the conduit joint 3 is convex to form a step 311. A circumferential side surface, close to an open end of the main body 31, of the step 311 is an inclined surface for the lower sleeve 12 to be transited and clamped in the other end of the step 311, so that the lower sleeve 12 is limited by the step 311 and cannot fall off from the conduit joint 3.

Figure 5:
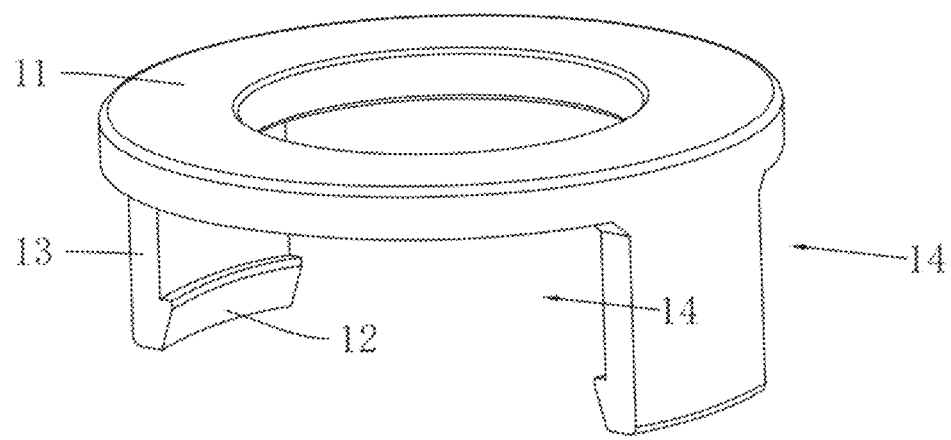
FIG. 5 is a structure diagram of a sleeve in one preferred embodiment of the present disclosure.

In order to achieve the assembly effect of the above-mentioned sleeve 1, in some embodiments, the structure of the lower sleeve 12 may also be a snap tooth structure (as shown in FIG. 5), and there are at least two snap teeth. The snap tooth structure can also be limited by the step 311 at the step 311 so as to avoid the problem that the sleeve 1 falls off from the conduit joint 3.

In addition, the inner diameter of the upper sleeve 11 may be equal to the inner diameter of the propeller 36. In a preferred embodiment, the inner diameter of the propeller 36 is preferably between the inner diameter of the propeller 36 and the outer diameter of the propeller 36. The sleeve 1 can abut against an end wall of the propeller 36 after being pressed down, thereby extruding the propeller 36, realizing the deformation of the gear ring 34 and the release of the conduit 4. It is worth mentioning that the extrusion manner is a manual extrusion release mode, which is just one of the ways to release the conduit 4, and the other way can be realized by inserting the releaser 2.

Figure 4:
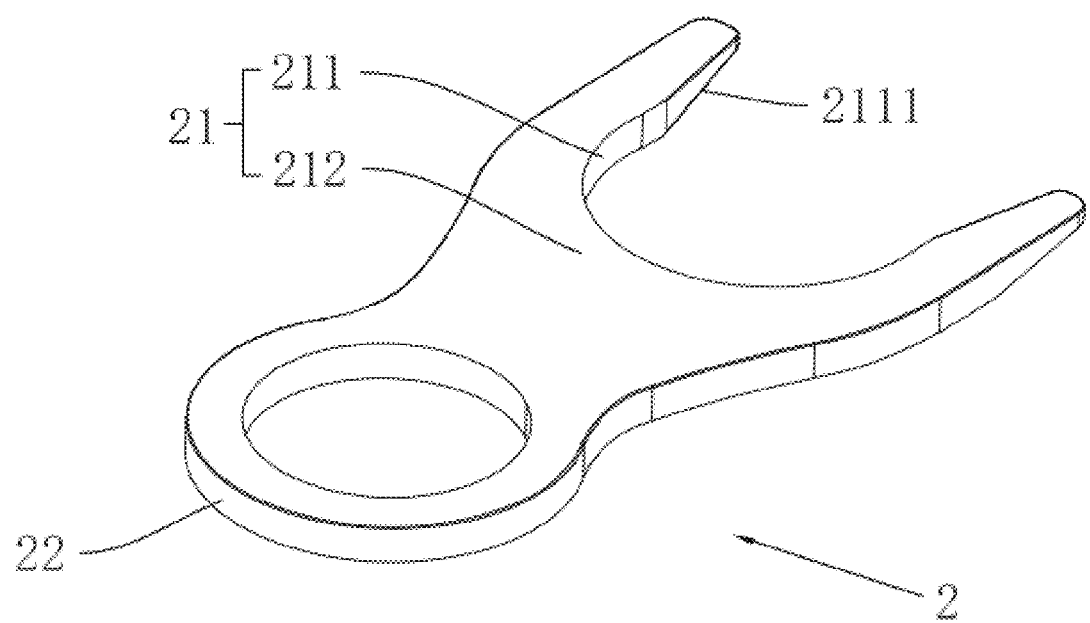
FIG. 4 is a schematic diagram of a releaser in a preferred embodiment of the present disclosure.

In some embodiments, as shown in FIG. 4, the releaser 2 includes an open release part 21 (located at a front end) and a handle part 22 located behind the release part 21. Wherein, the release part 21 includes two legs 211 and a waist 212 for connecting the two legs 211. The two legs 211 and the waist 212 are integrally formed, preferably. One end, away from the waist 212, of each of the two legs 211 is provided with a guide part 2111. The thickness of the guide part 2111 is gradually increased from one end away from the waist 212 to the other end. It is worth mentioning that in some embodiments, the thickness of the leg 211 can also change, so that the leg 211 and the guide part 2111 form a gradual transition form. At this time, the leg 211 and the guide 2111 are free of obvious limit.

As shown in FIG. 3, when it is necessary to release the conduit 4 clamped in the conduit joint 3, it is only necessary to insert the releaser 2 into a gap 141 between the upper sleeve 11 and the propeller 36. It is worth mentioning that the gap 141 should be smaller than the thickness of the leg 211 (in a state that the propeller 36 is not extruded by the releaser 2) in order to achieve extrusion for the propeller 36 when the releaser 2 is inserted, thereby allowing the gear ring 34 to loosen the conduit 4 and taking the conduit 4 from the conduit joint 3 easily.

Finally, as shown in FIG. 3, the sleeve 1 provided by the present disclosure can not only move in the axial direction on the conduit joint 3, but also rotate on the conduit joint 3 in a state that the connector 13 is long, so that the first notch 14 rotates to the angle and height that facilitates the insertion of the releaser 2 so as to overcome the problem of difficulty in operation when the conduit joint 3 is installed at a corner of a wall or blocked by articles.

The working process and the beneficial effects of the present disclosure are as follows. The sleeve 1 directly sleeves the outer wall of the conduit joint 3 with external force. The sleeve 1 and the conduit joint 3 are sold as a whole body. At this time, the upper sleeve 11 and the lower sleeve 12 are respectively located on both sides of the convex step 311. At the same time, the upper sleeve 11 and the lower sleeve 12 are respectively located outside the end of the conduit joint 3 and the circumferential side wall of the conduit joint 3.

When it is necessary to release the conduit 4 clamped in the conduit joint 3, the conduit 4 can be released directly by manually pressing the sleeve 1, or the releaser 2 can be inserted between the upper sleeve 11 and the propeller 36 at an end of the conduit joint 3, so that the propeller 36 extrudes the gear ring 34 inside the conduit joint 3. Therefore, the conduit 4 is loosened by the gear ring 34, and then the conduit 4 is easily taken out from the conduit joint 3.

The foregoing descriptions are merely exemplary embodiments of the present disclosure, but are not intended to limit the present disclosure. Any modification, equivalent replacement, or improvement made within the design concept of the present disclosure shall fall within the protection scope of the present disclosure.

What is claimed is:

1. An auxiliary release component of a conduit joint, comprising a sleeve (1) and a releaser (2), wherein
the sleeve (1) comprises an upper sleeve (11), a lower sleeve (12) and a connector (13) for connecting the upper sleeve (11) and the lower sleeve (12), a region between the upper sleeve (11) and the lower sleeve (12) being partitioned by the connector (13) to form at least one first notch (14); and wherein the releaser (2) comprises an open release part (21) and a handle part (22) located behind the release part (21);
wherein the release part (21) comprises two legs (211) and a waist (212) for connecting the two legs (211), one end, away from the waist (212), of each of the two legs (211) being provided with a guide part (2111), and thickness of the guide part (2111) being gradually increased from one end away from the waist (212) to the other end.

2. The auxiliary release component of a conduit joint according to claim 1, wherein two groups of connectors (13) are provided, and wherein the two groups of connectors (13) are symmetrically provided, a region between the upper sleeve (11) and the lower sleeve (12) being partitioned by the connectors (13) to form two symmetrical first notches (14).

3. The auxiliary release component of a conduit joint according to claim 1, wherein the two legs (211) and the waist (212) are integrally formed.

4. The auxiliary release component of a conduit joint according to claim 1, wherein the upper sleeve (11), the lower sleeve (12) and the connectors (13) are integrally formed.

5. The auxiliary release component of a conduit joint according to claim 1, wherein an inner wall of the connector (13) is in the shape of a cambered surface.

6. A conduit joint structure matched with the auxiliary release component according to claim 1, comprising a main body (31), wherein an inner wall of the main body (31) is concave inward to form a first avoidance channel (312) for a protruding portion (361) of a propeller (36) to move;

wherein the first avoidance channel (312) is internally provided with a conduit support member (35), the conduit support member (35) being divided into an upper part (351) and a lower part (352) independent from each other, and an inner wall of the upper part (351) being concave inward to form a second avoidance channel (3511) for the protruding portion (361) of a propeller (36) to move after being clamped; and wherein an inner wall of the lower part (352) is larger than an outer diameter of the conduit (4), the propeller (36) being capable of being inserted between the inner wall of the lower part (352) and an outer wall of the conduit (4), a bottom of the lower part (352) abutting against a gear ring (34), and a top of the lower part (352) being connected to the upper part (351).

7. The conduit joint structure according to claim 6, wherein a second notch (3512) is formed in the upper part (351).

\* \* \* \* \*